(12) United States Patent
Dosaka

(10) Patent No.: US 6,445,876 B1
(45) Date of Patent: Sep. 3, 2002

(54) IMAGE REPRODUCTION APPARATUS

(75) Inventor: Takeshi Dosaka, Yokohama (JP)

(73) Assignee: Denon, Ltd., Tokyo (JP)

( * ) Notice: Subject to any disclaimer, the term of this patent is extended or adjusted under 35 U.S.C. 154(b) by 0 days.

(21) Appl. No.: 09/099,064

(22) Filed: Jun. 16, 1998

(30) Foreign Application Priority Data

Jul. 9, 1997 (JP) .............................................. 9-183798

(51) Int. Cl.[7] .......................... H04N 5/91; H04N 5/225
(52) U.S. Cl. ........................... 386/77; 386/120; 386/68
(58) Field of Search .............................. 386/77, 68, 69, 386/55, 64, 65, 107, 117, 120, 121, 1, 6, 46, 38; H04N 5/91, 5/225

(56) References Cited

U.S. PATENT DOCUMENTS 5,126,851 A * 6/1992 Yoshimura et al.

FOREIGN PATENT DOCUMENTS

| JP | 3-148978 | 6/1991 |
| JP | 08-265703 | 10/1996 |

* cited by examiner

Primary Examiner—Robert Chevalier
(74) Attorney, Agent, or Firm—Dickstein Shapiro Morin & Oshinsky LLP

(57) ABSTRACT

The present image reproduction apparatus stores one or a plurality of still pictures from a moving picture, and plays back the moving picture from a position of one still picture, in accordance with the selection of that still picture out of the stored one or plurality of still pictures. A display control part 4 sequentially takes still pictures from a moving picture read from a disk and being displayed on a monitor 6, at time points when an image storing button of a console panel 8 is pushed. The display control part 4 reduces the taken still pictures, and stores them in menu frame memory 7, while storing the positions of the taken still pictures in sector ID address memory 12. When a menu-display button is pushed, the reduced and stored images are displayed on the monitor 6 as a multi-screen image. Then, when a jump button is pushed and one still picture is selected in the multi-screen image, the sector ID address memory 12 is referred to, and the moving picture is read and displayed from the position of the selected still picture.

6 Claims, 6 Drawing Sheets

IMAGE REPRODUCTION APPARATUS

BACKGROUND OF THE INVENTION

1. Field of the Invention

The present invention relates to a technique for displaying one or more still pictures taken from a moving picture in an image reproduction apparatus which reproduces information from a record medium such as a video disk containing the recorded moving picture.

2. Description of Related Art

As a technique for displaying a plurality of still pictures in an image reproduction apparatus, there is known, for example, a technique in which a display screen is separated into multi-screens in a video CD reproduction apparatus, and opening images of musical pieces (tracks) recorded in a video CD are displayed in the separated screens, respectively. In this technique, a moving picture in the opening part of each musical piece in turn is played back, frozen after a given period of time, and displayed as a still picture.

Further, as shown in Japanese Patent Laid-Open No. 8-265703, there is known a technique in which, from a moving picture reproduced from an information recording medium, still pictures are taken at any time points specified by a user, and displayed on a screen.

SUMMARY OF THE INVENTION

These conventional techniques are for displaying one or more still pictures taken from a moving picture.

Thus, for example, according to the above-described technique for displaying a plurality of still pictures in a multi-screen image, each still picture corresponding to a musical piece can be used as an index for estimating contents of that musical piece.

Such simple display, however, is not sufficient for a user to use a moving picture conveniently, and it is desirable that a moving picture from which a displayed still picture is taken can be used in relation to that still picture.

An object of the present invention is to provide an image reproduction apparatus which takes in and stores one or more scenes as still pictures from moving pictures at optional timing, displays that one or more still pictures stored, and, from a scene corresponding to a selected still picture, starts reproduction of a moving picture containing that scene.

Thus, the present invention provides an image reproduction apparatus for playing back moving pictures recorded in a record medium, comprising: stored image selection means for receiving selection of any scene of a moving picture under playback; image storing means for storing one or a plurality of still pictures constituting, in the moving pictures, a scene or scenes whose selection is received by the stored image selection means; address storing means for storing addresses indicating, in the moving pictures, positions of respective still pictures stored in the image storing means; menu displaying means for displaying the one or plurality of still pictures stored in the image storing means; a playback image selection means for receiving selection of one out of the one or plurality of still pictures displayed by the menu displaying means; and jump playback means for playing back a moving picture from the record medium, starting from a position which is stored in the address storing means and corresponds to the still picture whose selection is received by the playback image selection means, as a playback starting position in the moving picture.

According to thus-described image reproduction apparatus, a user can take and store any one or plurality of still pictures from a moving picture, and can then display the stored one or plurality of still pictures. Further, out of these displayed still pictures, a user can select a scene from which playback is to be started, by confirming its contents. From the scene corresponding to the selected still picture, playback of the moving picture containing the scene in question can be started.

DETAILED DESCRIPTION OF THE PREFERRED EMBODIMENTS

Now, an embodiment of the image reproduction apparatus according to the present invention will be described, giving an example of a video CD reproduction apparatus.

Figure 1:
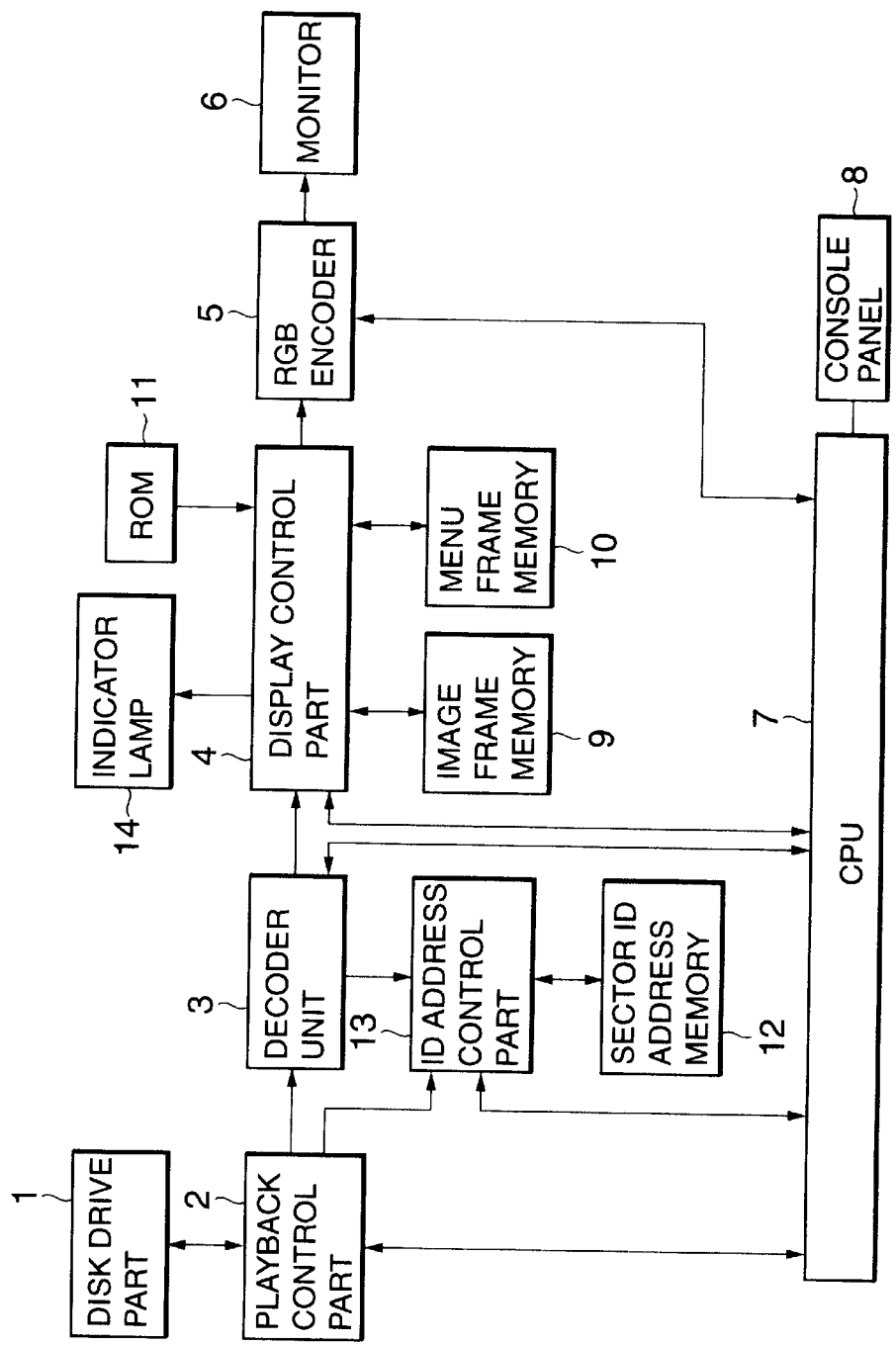
FIG. 1 is a block diagram showing a configuration of an image reproduction apparatus according to the present invention.

FIG. 1 shows a configuration of the image reproduction apparatus according to the present invention.

In the figure, a disk drive part 1 is under the control of servo-control circuit (not shown) and performs rotational control of a disk, and traverse, tracking, and focus controls of an optical pickup. A playback control part 2 is under the control of instructions from CPU 7, controls reading from the disk drive part 1 and jumping of the read position, and sends image data read from the disk to a decoder unit 3. Further, the playback control part 2 sends sector ID addresses of sectors from which the image data has been read to an ID address control part 13. Here, in the disk, data is separated into a plurality of data blocks, and each data block has a sector ID address indicating its position. Further, image data is recorded in the disk, being coded using the MPEG (Moving Picture Experts Group) system.

The decoder unit 3 decodes the MPEG-coded image data sent from the disk drive part 1, and sends the decoded image data to a display control part 4.

On the other hand, the ID address control part 13 holds the sector ID address of the data block from which the decoding has been started in the decoder unit 3, and delays the sector ID address for a time period between the decoding and the displaying of the image data recorded in the data blocks, and then stores the sector ID address into a sector ID address memory 12 in accordance with a sector-ID-address-write instruction from CPU 7. By this operation, even in a case where a decoding order is different from a displaying order, as in the MPEG system, sector ID addresses are reordered in accordance with the order of displaying, and thereafter stored in the sector ID address memory 12. Here, the sector ID address memory 12 comprises nine memory blocks controlled with block numbers 1–9, and each memory block can store one sector ID address, making a total of nine addresses. Each sector ID address stored in each of the nine memory blocks of the sector ID address memory 12 can be deleted in accordance with an image-delete instruction of CPU 7.

Next, menu frame memory 10 comprises 3×3 (nine, in total) memory blocks controlled with block numbers 1–9, and each memory block can store image data reduced to one-ninth by thinning out to one third in length and width.

Further, ROM 11 is a read only memory which stores image data of characters "1" through "9" in advance. As described below, these character image data are written over respective parts of the nine reduced image data in the menu frame memory 10.

At the time of normal playback, the display control part 4 converts the image data sent from the decoder unit 3, to digital RGB video data, and, after storing it in image frame memory 9 temporarily, sends the digital RGB video data to an RGB encoder 5. Further, the display control part 4, on receiving an image-store instruction from CPU 7, selects one vacant memory block out of the nine memory blocks of the menu frame memory 10, reduces an image existing in the image frame memory 9 at that time to one-ninth, and stores it in the selected memory block of the menu frame memory 10. The display control part 4 reads the image data of the number corresponding to the selected memory block number from ROM 11, and writes it over a given position in the selected memory block, for example, an upper left portion of the image. In the case that there is not a vacant memory block in the image frame memory 9, the display control part 4 lights an indicator lamp 14 showing that the memory is full.

Further, the display control part 4, on receiving a menu-display instruction from CPU 7, sends image data stored in the respective memory blocks of the menu frame memory 10 to the RGB encoder 5. On receiving an image-delete instruction from CPU 7, the display control part 4 deletes the image data stored in the respective nine memory blocks of the menu frame memory 10.

Next, the RGB encoder 5 converts the received image data (digital RGB video data) to analog RGB video signal which can be displayed on a monitor 6, and supplies it to the monitor 6. In this way, the image is displayed on the monitor 6.

A console panel 8 is provided with buttons for playback, stop, menu-display, image-store, jump, and menu-delete, as well as 10-key buttons (numeric keys for 0–9), and the like.

In the following, operation of the image reproduction apparatus of the present embodiment will be described.

It will be noted that, in the image reproduction apparatus of the present embodiment, operations of playback, stop, rapid traverse, and snap back of a moving picture recorded in a disk, and jumping between tracks are similar to the conventional apparatus. Accordingly, description on these operations will be omitted here, and characteristics of the present embodiment will be described.

First, there will be described operation when the image-store button of the console panel 8 is pushed.

Figure 2:
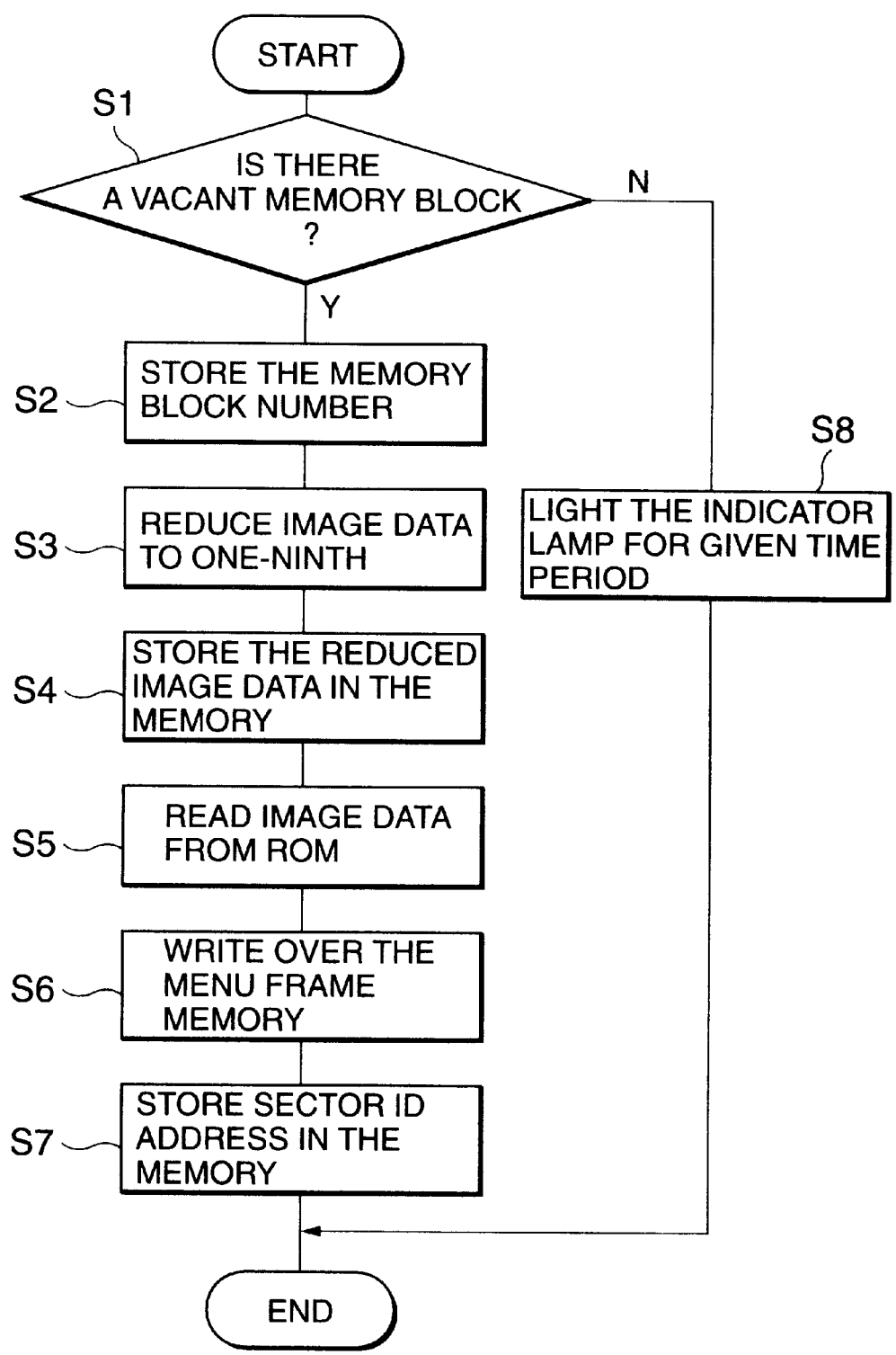
FIG. 2 is a flowchart showing a processing procedure for storing images in the image reproduction apparatus.

FIG. 2 shows a processing procedure performed by the image reproduction apparatus in this case.

The image-store button is a button for storing an image and a sector ID address of its image, that image existing at any position selected by an operator during playback of a moving picture.

As shown, when informed from CPU 7 that the image-store button has been pushed, the display control part 4 checks if there is a vacant memory block in the menu frame memory 10, in Step S1. In the case that a vacant memory block exists, the display control part 4 stores the number of that vacant memory block, in Step S2, and reduces the image data (image data of one still picture constituting the moving picture) to one-ninth by thinning out to one third in both length and width in step S3. Then, in Step S4, the display control part 4 stores the image reduced in Step S3 into the menu frame memory 10 at its memory block corresponding to the memory block number stored in Step S2.

Next, in Step S5, from ROM 11, the display control part 4 reads the image data of the number corresponding to the memory block number stored in Step S2. Then, in Step S6, the display control part 4 writes that image data over the upper left portion of the reduced image data in the memory block which stored that image data in Step S4.

On the other hand, when the ID address control part 13 is informed by CPU 7 that the image-store button has been pushed, the ID address control part 13 operates in Step S7 so as to store a sector ID address in the sector ID address memory 12 at its memory block corresponding to the memory block number stored in Step S2. That sector ID address is one of the image data which was displayed on the monitor 6 when the image-store button was pushed and has been delayed and held in the ID address control part 13.

On the other hand, when, in Step S1, it is found that a vacant memory block does not exist, the display control part 4 lights the indicator lamp 14 for indicating an invalid pushing operation, for a give time period (for example, 0.5 second) in Step S8.

Next, there will be described operation when the menu-display button of the console panel 8 is pushed.

Figure 3:
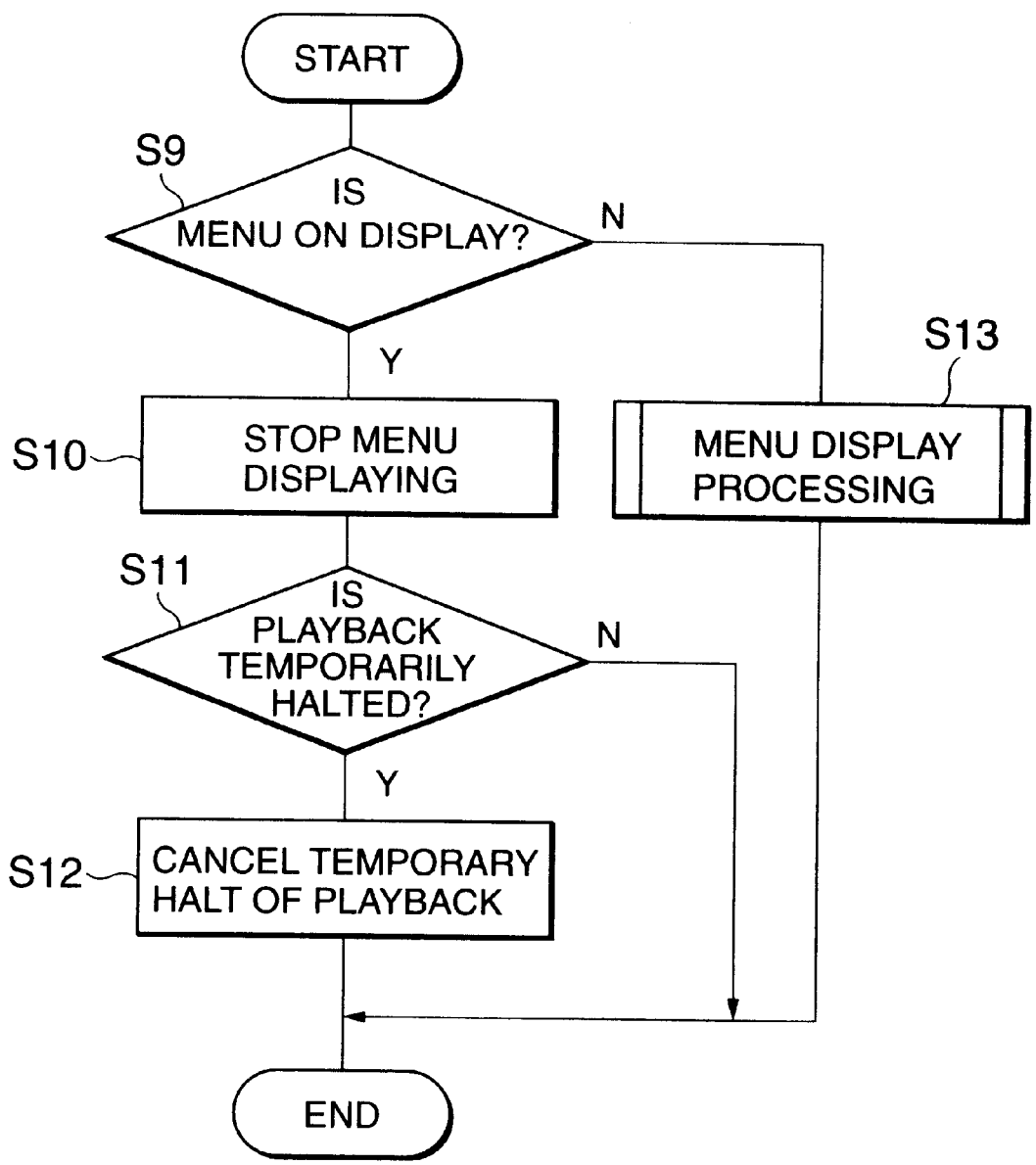
FIG. 3 is a flowchart showing a processing procedure for displaying a menu in the image reproduction apparatus.

FIG. 3 shows a procedure for processing to be carried out in this case.

Here, the menu-display button is a button for carrying out menu displaying in such a manner that nine reduced images stored in the menu frame memory 10 in advance are displayed as a multi-screen image consisting of 3×3 reduced images.

In this processing, when the display control part 4 is informed by CPU 7 that the menu-display button has been pushed, the display control part 4 judges if the menu is displayed at present, in Step S9. In the case that the menu is displayed now, the procedure goes to Step S10, and the display of the menu is stopped. Then, in Step 11, it is judged if playback of a moving picture is halted temporarily. If it is in a temporarily-halted state, the procedure goes to Step S12, in which the display control part 4 is controlled to cancel the temporarily-halted state, and to resume playback, and to end this processing. On the other hand, if it is not in a temporarily-halted state, this processing is ended without carrying out any further step.

On the other hand, when, in Step S9, the menu is not on display, the procedure goes to Step S13, and menu displaying is carried out.

Figure 4:
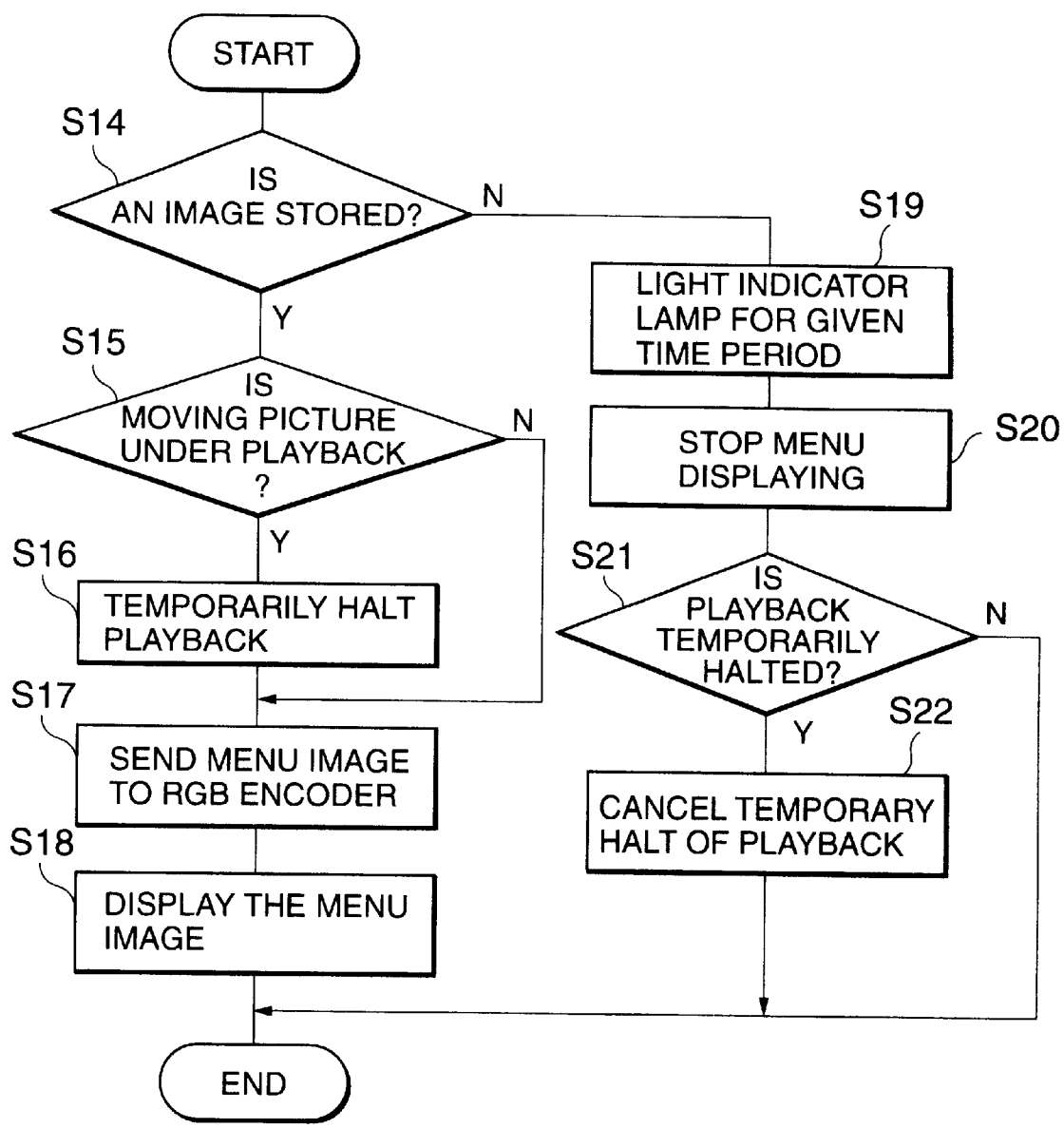
FIG. 4 is a flowchart showing a processing procedure for displaying a menu in the image reproduction apparatus.

Detailed procedure of this Step S13 for carrying out menu displaying is shown in FIG. 4.

As shown, in this processing the display control part 4 first judges if the reduced images for menu displaying are stored in the menu frame memory 10, at step 14. When at least one reduced image for display is stored, the procedure goes to Step S15, in which it is judged if a moving picture is currently being played back. If it is currently being played back, the procedure goes to Step S16, and the playback is halted temporarily. Then, in Step S17, nine reduced images in the menu frame memory 10 are sent to the RGB encoder 5 so as to construct a multi-screen image consisting of 3×3 reduced images. Then, in Step S18, the multi-screen image is displayed on the monitor 6, and the processing is ended.

In that case, the image data written over at the time of storing the reduced images in question, i.e. the numbers 1–9, are respectively shown in upper left portions of the reduced images displayed in the multi-screen format. Further, among the 3×3 reduced images of the multi-screen image, a part in which a corresponding reduced image to be displayed is not stored in the menu frame memory 10 is displayed as a blank.

In the case that, in Step S14, no image to be displayed is stored in the menu frame memory 10, the display control part 4 goes to Step S19 and lights the indicator lamp 14 for the given time period, and then stops displaying of the menu in Step S20. Then, in Step S21, it is judged if playback is in a temporarily-halted state. When it is in the temporarily-halted state, it is canceled in Step S22, and the playback is resumed, and this processing is ended. On the other hand, when it is not in the temporarily-halted state, the processing is ended without carrying out any further step.

Next, there will be described operation when the jump button of the console panel 8 is pushed.

Figure 5:
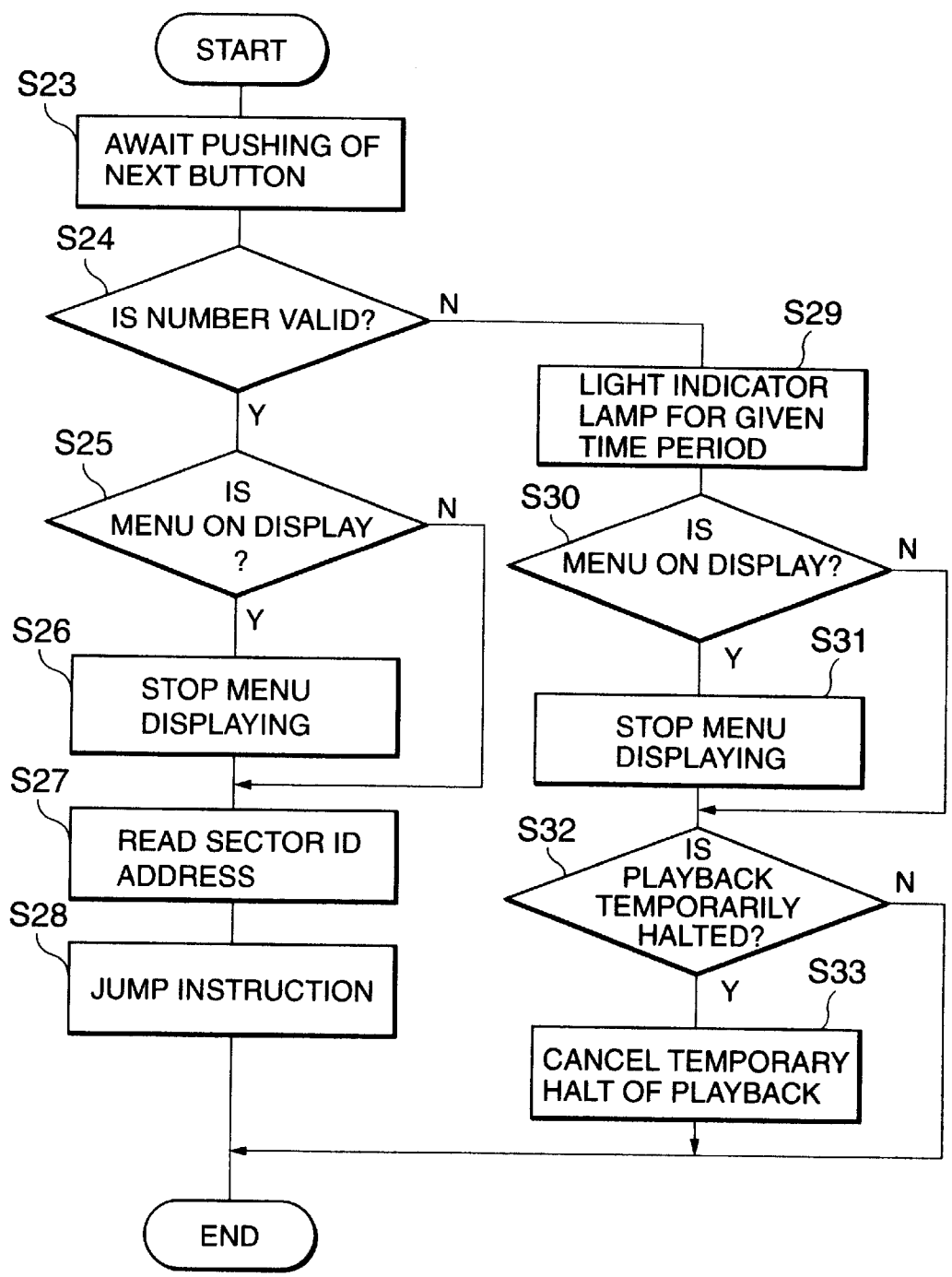
FIG. 5 is a flowchart showing a processing procedure for jumping in the image reproduction apparatus.

FIG. 5 shows a procedure for processing to be carried out in this case.

Here, the jump button is a button for starting playback of a moving picture from a position corresponding to a reduced image stored by the image-store button.

In this case, as shown, when the jump button is pushed, CPU 7 awaits pushing of the next button in Step S23. When there is input by the next button, it is judged if the pushed button is valid, in Step S24. Here, since nine scenes can be stored, it is valid if the input by the next button after the jump button is a number of a memory block of the menu frame memory 10, which stores a reduced image designated by the image-store button, out of the numbers 1–9.

Upon being informed from CPU 7 that a valid numeric button has been pushed, the display control part 4 judges, in Step S25, if the menu is currently being displayed. When the menu is currently being displayed, menu displaying is stopped in Step S26. On the other hand, CPU 7 reads a sector ID address corresponding to the valid number from the sector ID address memory 12. Then, in Step S28, CPU 7 sends a jump instruction as well as the sector ID address read in Step S27 to the playback control part 2.

The playback control part 2 searches the received sector ID address, and when it is detected, playback of the moving picture is started from the position of that sector ID address.

On the other hand, in Step S24, if a button other than the valid buttons is pushed, the procedure goes to Step S29. In Step S29, upon being informed from CPU 7 that an invalid button has been pushed, the display control part 4 lights the indicator lamp 14 for a given period of time, and, in Step S30, judges if the menu is on display. When the menu is on display, menu displaying is stopped in Step S31, and the procedure goes to Step S32. In Step S32, it is judged if playback of a moving picture is in a temporarily-halted state, and when it is in a temporarily-halted state, the halted state is canceled to resume the playback in Step S33 to end this processing. When it is not in a temporarily-halted state, this processing is ended without carrying out a further step.

Next, there will be described operation when the menu-delete button of the console panel 8 is pushed.

The menu-delete button is a button for deleting contents of any memory blocks of the menu frame memory 10 and of the sector ID address memory 12.

Figure 6:
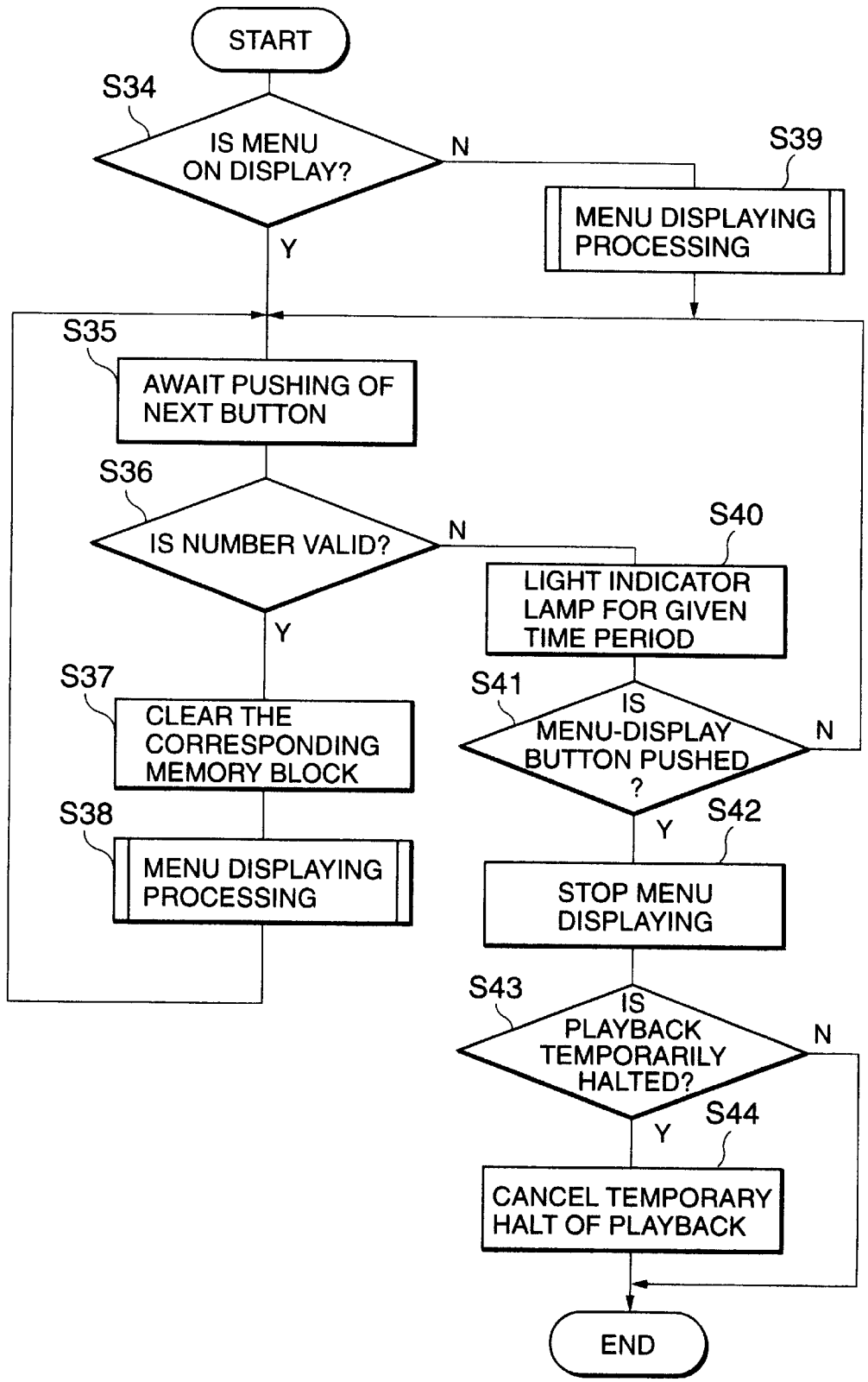
FIG. 6 is a flowchart showing a processing procedure for image deletion.

FIG. 6 shows a procedure for processing to be carried out in this case.

As shown, in this processing, when the menu-delete button is pushed, in Step S34 the CPU 7 judges if the menu is on display, and when the menu is on display it goes to Step S35, and awaits pushing of the next button.

On the other hand, when the menu is not on display, the procedure goes to Step S39. In Step S39, the processing of FIG. 4 is carried out. Namely, when a reduced image to be displayed exists in the menu frame memory 10, playback of a moving picture is temporarily halted and menu is displayed. The procedure also goes to Step S35, and pushing of the next button is awaited. However, when a reduced image to be displayed in Step S39 does not exist, lighting of the indicator lamp 14 and resuming of the temporarily-halted moving picture are carried out, as in the processing of FIG. 4, and this processing of FIG. 6 is ended.

In Step S35, pushing of the next button is awaited. When the next button after the menu-delete button is pushed, the procedure goes to Step S36. In Step S36, it is judged if the pushed button is valid. Here, since nine scenes can be stored, it is valid if the input by the next button after the menu-delete button is a number of a memory block of the menu frame memory 10, which stores a reduced image designated by the image-store button, out of the numbers 1–9.

When the next button after the menu-delete button is valid, the procedure goes to Step S37. In Step S37, CPU 7 controls the ID address control part 13 and deletes contents of the memory blocks of the sector ID address memory 12 and of the menu frame memory 10 corresponding to that valid number, and processing continues to Step S38. Here, deletion of the memory block of the menu frame memory 10 is carried out by writing a blank image into the memory block.

Next, in Step S38, the processing of FIG. 4 is carried out similarly as in step S39. Thus, menu displaying of the reduced images which remain in the menu frame memory 10 after deleting the above memory block of the menu frame memory 10 is carried out. If, after the deletion of the memory block of the menu frame memory 10, there is no reduced image remaining in the menu frame memory 10, processing similar to the lighting of the indicator lamp 14 and resuming of the temporarily halted moving picture in FIG. 4 is carried out, and the present processing of FIG. 6 is ended.

In the case that, in the processing in Step S38, menu displaying is carried out again, the procedure returns to Step S35 and awaits input of a button again.

In the case that, in Step S36, an invalid button is pushed, the procedure goes to Step S40, and CPU 7 controls the display control part 4 to light the indicator lamp 14 for a given time period, which shows invalidity of the operation, and the procedure then goes to Step S41. In Step S41, it is judged if the button pushed in Step S36 is the menu-display button. When it is the menu-display button, the procedure goes to Step S42, and menu displaying is stopped. Then, in Step S43, it is judged if playback of the moving picture is temporarily halted. In the case that it is in a temporarily-halted state, the procedure goes to Step S44, and in that step, the temporarily-halted state is canceled and the present processing is ended. On the other hand, if it is not in a temporarily-halted state, the processing is ended without carrying out a further step.

Further, when it is judged that the pushed button is not the menu-display button in Step S41, the procedure returns to Step S35 and awaits input of a button again.

Hereinabove, the construction and operation of the image reproduction apparatus of the present embodiment has been described.

In the following, there will be described a mode of utilization of thus-described image reproduction apparatus.

In the case that the image-store button is pushed when certain scene is displayed during playback of a moving picture, an image (still picture) constituting that scene is stored in the menu frame memory 10 as a reduced image together with a number, according to the processing procedure of FIG. 3. If it is desired to store another scene, the image-store button is pushed when that scene is displayed. Thus, reduced images and numbers at the time points of pushing the image-store button are stored in the menu frame memory 10, successively. In the present embodiment, images (still pictures) can be stored from nine scenes at maximum.

Thereafter, to enjoy a certain scene again, the menu-display button is pushed to display the reduced images and numbers of the stored scene, in the form of the menu on the monitor 6. Then, after pushing the jump button, the number of a desired scene is selected by using 10-key buttons, and then, according to the above-described processing of FIG. 5, the moving picture including the selected scene is played back from that scene in question. If it is desired to enjoy that scene repeatedly, it is sufficient to repeat such an operation as following pushing of the jump button with selection of the number of that scene with the 10-key buttons.

Any stored scene can be deleted by designating the number of the scene to be deleted with the 10-key button, while confirming the stored scenes in the menu display which is shown by the processing of FIG. 6 started by pushing the image-delete button. Thus, space for storing a new scene can be produced.

Here, for example, the present image reproduction apparatus may be applied to a digital versatile disk which can store a plurality of moving pictures taken from different angles in one data stream being multiplexed in a time-sharing manner, and can reproduce the images at each angle, being switched in accordance with selection by a viewer. In that case, during playback of the moving pictures seen from respective angles, the image-store button may be used to store, for example, scenes of starting positions of the moving pictures from respective angles, so that it is possible to use the present apparatus to switch and play back the images from different angles while carrying out visual confirmation.

According to the image reproduction apparatus of the present embodiment, it is possible to store any one or more scenes constituting a moving picture while the moving picture is played back, to display that one or more scenes at the same time, to receive selection of each scene displayed, and to start playback of the moving: picture from the selected scene received. Further, it is possible to delete each of the stored scenes with visual confirmation, by selecting the displayed scenes to be deleted.

In the above-described embodiment, there has been described the case where nine still images reduced to one-ninth are stored, and these nine reduced images are displayed in a menu displaying image. However, the number and the reducing rate of the reduced images may be different from this. Further, it is not necessary that all the reduced images are displayed in one screen, and, for example, may be displayed separately in a plurality of screens which can be switched by a user operation. Further, instead of a still picture, a part of a moving picture may be stored and displayed in a menu.

As described above, the present invention provides the image reproduction apparatus which can take a plurality of scenes as still pictures from moving pictures at optional timing, can display the still pictures stored, and can start playback of a moving picture which contains a scene corresponding to a still picture selected from the displayed ones.

What is claimed is:

1. An image reproduction apparatus for playing back moving pictures recorded in a record medium, comprising:
   stored image selection means for receiving selection of any scene of a moving picture under playback;
   image storing means for storing one or a plurality of still pictures constituting, in the moving pictures, a scene or scenes whose selection is received by said stored image selection means;
   address storing means for storing addresses indicating, in the moving pictures, positions of respective still pictures stored in said image storing means;
   menu displaying means for displaying said one or plurality of still pictures stored in said image storing means;
   playback image selection means for receiving selection of one out of said one or plurality of still pictures displayed by said menu displaying means; and
   jump playback means for playing back a moving picture from said record medium, starting from a position which is stored in said address storing means and corresponds to the still picture whose selection is received by said playback image selections means, as a playback starting position in the moving picture, wherein:
   when said menu displaying means is directed to carry out menu displaying while the moving picture is being played back, the menu displaying means halts playback of the moving picture and displays the one or plurality of still pictures stored in said image storing means, and
   when said menu displaying means is directed to end the menu displaying while the one or plurality of still pictures are being displayed, the menu displaying means resumes the playback of said halted moving picture.

2. The image reproduction apparatus according to claim 1, wherein:
   said image storing means stores said one or plurality of still pictures by reducing each still picture in length-wise and width-wise directions; and
   said menu displaying means displays, in combination in one screen, said plurality of still pictures stored in said image storing means.

3. The image reproduction apparatus according to claim 1, wherein:
   said stored image selection means is provided with means for outputting a warning when, on receiving selection of a new scene, there is no space in said image storing means for storing a still picture constituting said scene in the moving picture.

4. The image reproduction apparatus according to claim 1, wherein:
   said menu displaying means displays, together with respective identification numbers added, the plurality of still pictures stored in said image storing means; and
   said playback image selection means receives the selection of said one still picture by means of input of an identification number added to the still picture in question.

5. The image reproduction apparatus according to claim 4, wherein:
   said menu displaying means is provided with means for outputting a warning when said playback image selection means receives a number other than said identification numbers displayed being respectively added to the plurality of still pictures stored in said image storing means.

6. An image reproduction apparatus for playing back moving pictures recorded in a record medium, comprising:

stored image selection means for receiving selection of any scene of a moving picture under playback;

image storing means for storing one or a plurality of still pictures constituting, in the moving pictures, a scene or scenes whose selection is received by said stored image selection means;

address storing means for storing addresses indicating, in the moving pictures, positions of respective still pictures stored in said image storing means;

menu displaying means for displaying said one or plurality of still pictures stored in said image storing means;

playback image selection means for receiving selection of one out of said one or plurality of still pictures displayed by said menu displaying means;

jump playback means for playing back a moving picture from said record medium, starting from a position which is stored in said address storing means and corresponds to the still picture whose selection is received by said playback image selections means, as a playback starting position in the moving picture;

delete image selection means for receiving selection of a still picture, by means of input of an identification number added to said still picture, out of the plurality of still pictures displayed by said menu displaying means; and image deleting means for deleting, from said image storing means, said still picture whose selection is received by said delete image selection means, and for deleting a position of said deleted still picture in the moving picture stored in said address storing means, wherein:

said menu displaying means displays, together with respective identification numbers added, the plurality of still pictures stored in said image storing means;

said playback image selection means receives the selection of said one still picture by means of input of an identification number added to the still picture in question.

* * * * *